US011082982B2

(12) United States Patent
Liu (10) Patent No.: US 11,082,982 B2
(45) Date of Patent: Aug. 3, 2021

(54) METHODS DEVICES, AND SYSTEMS, FOR ALLOCATION OF UPLINK RESOURCES FOR WIRELESS DATA TRANSMISSION (71) Applicant: HUAWEI TECHNOLOGIES CO., LTD., Guangdong (CN)

(72) Inventor: Yalin Liu, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/460,885

(22) Filed: Jul. 2, 2019

(65) Prior Publication Data
US 2019/0327725 A1    Oct. 24, 2019

Related U.S. Application Data (63) Continuation of application No. PCT/CN2017/119803, filed on Dec. 29, 2017.

(30) Foreign Application Priority Data

Jan. 5, 2017  (CN) .......................... 201710008454.7

(51) Int. Cl.
H04W 72/04    (2009.01)
(52) U.S. Cl.
CPC ....... H04W 72/048 (2013.01); H04W 72/042 (2013.01)
(58) Field of Classification Search
CPC ... H04W 72/048; H04W 72/042; H04W 4/02; H04W 28/02; H04W 72/04; H04W 4/021; H04W 12/06; H04W 28/0226
See application file for complete search history.

(56) References Cited

U.S. PATENT DOCUMENTS 9,510,331 B2 * 11/2016 Rune ................ H04W 72/0413
2006/0204009 A1   9/2006 Li et al.
(Continued)

FOREIGN PATENT DOCUMENTS

CN    102843696 A    12/2012
CN    104735785 A    6/2015
(Continued)

OTHER PUBLICATIONS

CATT, "Discussion on UL grant-free transmission" [online], 3GPP TSG RAN WG1 #87 R1-1611400,Nov. 18, 2016,total 3 pages.
(Continued)

*Primary Examiner* — Ian N Moore
*Assistant Examiner* — Rushil Parimal Sampat
(74) *Attorney, Agent, or Firm* — Womble Bond Dickinson (US) LLP (57) ABSTRACT Embodiments of this application provide a data transmission method, a terminal device, and a network side device. The method may include receiving, by a terminal device, a first identifier (ID). The method may also include indicating, by the terminal device, mobility information of the terminal device to the first network side device. Furthermore, the method may include receiving, by the terminal device, target grant free information indicated by the first network side device, where the target grant free resource is a dedicated grant free resource or a universal grant free resource, data information sent by the terminal device to the first network side device using the dedicated grant free resource includes data sent by the terminal device, and data information sent by the terminal device to the first network side device using the universal grant free resource includes data sent by the terminal device and the first ID.

17 Claims, 4 Drawing Sheets (56) References Cited

U.S. PATENT DOCUMENTS

| | | | |
|---|---|---|---|
| 2016/0302076 A1 | 10/2016 | Chou et al. | |
| 2016/0302226 A1 | 10/2016 | Kim et al. | |
| 2017/0013635 A1 | 1/2017 | Quan et al. | |
| 2018/0027493 A1 | 1/2018 | Li et al. | |
| 2018/0124598 A1 | 5/2018 | Zeng | |
| 2019/0335448 A1* | 10/2019 | Yang | H04W 72/0413 |

FOREIGN PATENT DOCUMENTS

| | | |
|---|---|---|
| CN | 105379381 A | 3/2016 |
| CN | 105992373 A | 10/2016 |
| CN | 106060937 A | 10/2016 |
| JP | 2017511033 A | 4/2017 |
| WO | 2015129985 A1 | 9/2015 |
| WO | 2016/205991 A1 | 12/2016 |

OTHER PUBLICATIONS

Huawei, HiSilicon, "UL data transmission in RRC_INACTIVE"[online], 3GPP TSG RAN WG2 #96 R2-168544, Nov. 18, 2016, total 9 pages.

\* cited by examiner

METHODS DEVICES, AND SYSTEMS, FOR ALLOCATION OF UPLINK RESOURCES FOR WIRELESS DATA TRANSMISSION

CROSS-REFERENCE TO RELATED APPLICATIONS

This application is a continuation of International Application No. PCT/CN2017/119803, filed on Dec. 29, 2017, which claims priority to Chinese Patent Application No. 201710008454.7, filed on Jan. 5, 2017. The disclosures of the aforementioned applications are hereby incorporated by reference in their entireties.

TECHNICAL FIELD

Embodiments of this application relate to the field of communications technologies, and more specifically, to a data transmission method, a terminal device, and a network side device.

BACKGROUND

In an existing Long Term Evolution (LTE) system, for a user in a connected mode, when needing to transmit uplink data, a terminal device uses a mechanism of an uplink scheduling request (SR) or a buffer status report (BSR). More specifically, the terminal device sends an uplink scheduling request or a buffer status report to a network side device, to notify the network side device that the terminal device needs an uplink resource for data transmission. After receiving the scheduling request from the terminal device or determining, based on the BSR, that resource scheduling needs to be performed for the user, the network side device allocates particular resources to the terminal device, and the terminal device transmits data on these allocated resources. Such a scheduling-based mechanism causes significant signaling overhead, and also causes transmission delay.

In future fifth-generation wireless (5G), a service is provided for massive machine type communication (mMTC). A feature of such a service is that there are a large quantity of these types of devices, and transmission of infrequent small data is dominant. For an mMTC service, a basic requirement is that there is a very high requirement on a battery life. Therefore, a very high requirement is imposed on energy consumption. If a scheduling-based mechanism is used, an increase in energy consumption is caused by a signaling process, as discussed above, bringing a challenge to the mMTC service. In addition, for signaling at some application layers, a large quantity of infrequent small data is transmitted. If such a service is transmitted using a scheduling-based method, significant signaling overheads are caused. To resolve the foregoing problem, a grant free technical solution is proposed in the industry. Grant free means that in a public land mobile network (PLMN), a terminal device can transmit data without requesting, by using a scheduling request, a network side device to allocate a resource. A grant free user may directly send data information to the network side device based on different features of data transmission, for example, a transmission delay or reliability requirement, without entering the connected mode.

When transmitting data using a grant free technology, the network side device needs to determine an identity of a transmit end of the received data information. In a current technical solution, the network side device may allocate one dedicated resource to each terminal device within a service scope for grant free access. The dedicated resource mainly includes an identifier (ID) allocated to the user, or an orthogonal sequence such as a demodulation reference signal (DMRS), and a grant free time-frequency resource available for the user. The grant free time-frequency resource may be shared by a plurality of users having orthogonal sequences. When sending data information, each terminal device uses a dedicated grant free resource allocated by the network side device. Different terminal devices have different dedicated grant free resources. In this way, the network side device may determine, based on a grant free resource used when the network side device receives the data information, an identity of a transmit end of the data information. However, there are limited grant free resources, and the network side device cannot ensure that the network side device can allocate a dedicated grant free resource to each terminal device within the service scope. In another technical solution, the network side device may allocate a universal grant free resource. The universal grant free resource may include a plurality of grant free resources. The terminal device may select one grant free resource to send data information to the network side device. The data information carries not only data sent by the terminal device but also an identifier of the terminal device. Different terminal devices may send data messages to the network side device using a same grant free resource. The network side device may determine, based on an identifier carried in a received data message, an identity of a transmit end sending the data message. Although the technical solution can effectively resolve the problem that the network side device cannot ensure that the network side device can allocate a dedicated grant free resource to each terminal device within the service scope, the data message sent by the terminal device has a relatively large size. Therefore, a technical solution is required to resolve the problems existing in the foregoing two technical solutions.

SUMMARY

Embodiments of this application provide a data transmission method, a terminal device, and a network side device, so that the terminal device can use a proper grant free resource.

According to a first aspect, an embodiment of this application provides a data transmission method. The method includes: receiving, by a terminal device, a first identifier (ID), where the first ID is an ID allocated by a first network side device to the terminal device, the terminal device is located in a first area, the first area is an area in which the first network side device provides a service, and the first ID is valid in the first area; indicating, by the terminal device, mobility information of the terminal device to the first network side device; and receiving, by the terminal device, target grant free information indicated by the first network side device, where the target grant free resource is a dedicated grant free resource or a universal grant free resource, data information sent by the terminal device to the first network side device using the dedicated grant free resource includes data sent by the terminal device, and data information sent by the terminal device to the first network side device by using the universal grant free resource includes data sent by the terminal device and the first ID. According to the foregoing technical solution, the terminal device may obtain a grant free resource specified by the network side device, to send data to the network side device based on the grant free resource specified by the network side device.

With reference to the first aspect, in a first possible embodiment of the first aspect, the indicating, by the terminal device, mobility information of the terminal device to the first network side device includes: determining, by the terminal device, the mobility information, and sending the mobility information to the first network side device; or sending, by the terminal device, first data information to the first network side device, where the first data information includes the first ID and data sent by the terminal device. According to the foregoing technical solution, the terminal device may provide the mobility information for the network side device, so that the network side device determines, based on the mobility information, a grant free resource available for the terminal device.

With reference to the first possible embodiment of the first aspect, in a second possible embodiment of the first aspect, the determining, by the terminal device, the mobility information includes: obtaining, by the terminal device, status information of the terminal device, where the status information of the terminal device includes location information of the terminal device and/or a mobility attribute of the terminal device; and determining, by the terminal device, the mobility information of the terminal device based on the status information of the terminal device. In the foregoing technical solution, the terminal device may voluntarily determine the mobility information.

With reference to any one of the first aspect or the foregoing possible embodiments of the first aspect, in a third possible embodiment of the first aspect, the method further includes: when determining that the target grant free resource is the dedicated grant free resource, sending, by the terminal device, second data information to the first network side device by using the dedicated grant free resource, where the second data information includes data sent by the terminal device; or when determining that the target grant free resource is the universal grant free resource, sending, by the terminal device, third data information to the first network side device by using the universal grant free resource, where the third data information includes data sent by the terminal device and the first ID. According to the foregoing technical solution, the terminal device may send a corresponding data message based on a type of the grant free resource indicated by the network side device.

With reference to the first aspect, the first possible embodiment of the first aspect, or the second possible embodiment of the first aspect, in a fourth possible embodiment of the first aspect, when the target grant free resource is the dedicated grant free resource, the method further includes: receiving, by the terminal device, a valid range of the target grant free resource that is sent by the first network side device; determining, by the terminal device, whether the valid range of the target grant free resource is exceeded; and if the valid range of the target grant free resource is not exceeded, sending second data information to the first network side device by using the dedicated grant free resource, where the second data information includes data sent by the terminal device; or if the valid range of the target grant free resource is exceeded, sending third data information to the first network side device by using the universal grant free resource, where the third data information includes data sent by the terminal device and the first ID. According to the foregoing technical solution, the terminal device may send a corresponding data message based on a type of the grant free resource indicated by the network side device.

With reference to the third possible embodiment of the first aspect or the fourth possible embodiment of the first aspect, in a fifth possible embodiment of the first aspect, before the sending, by the terminal device, the second data information to the first network side device by using the universal grant free resource, the method further includes: determining, by the terminal device, that the terminal device is located in the first area. According to the foregoing technical solution, when determining that the terminal device is located in the first area, the terminal device determines that the terminal device may communicate with the network side device by using the ID allocated by the network side device and the target grant free resource.

With reference to any one of the first aspect or the foregoing possible embodiments of the first aspect, in a sixth possible embodiment of the first aspect, before the indicating, by the terminal device, mobility information of the terminal device to the first network side device, the method further includes: determining, by the terminal device, to move to the first area from a second area, where a second network side device provides a service in the second area. According to the foregoing technical solution, when determining that the terminal device moves, the terminal device re-obtains an ID and a target grant free resource allocated by the network side device.

According to a second aspect, an embodiment of this application provides a data transmission method. The method includes: allocating, by a network side device, a first identifier (ID) to a terminal device, where the terminal device is located in a first area, the first area is an area in which the network side device provides a service, and the first ID is valid in the first area; obtaining, by the network side device, mobility information of the terminal device; determining, by the network side device, a target grant free resource based on the mobility information, where the target grant free resource is a dedicated grant free resource or a universal grant free resource, data information received by the network side device by using the universal grant free resource includes data and an ID of a terminal device sending the data, and data information received by the terminal device by using the dedicated grant free resource includes data; and indicating, by the network side device, the target grant free resource to the terminal device. According to the foregoing technical solution, the network side device may allocate a corresponding grant free resource to the terminal device based on the mobility information of the terminal device.

With reference to the second aspect, in a first possible embodiment of the second aspect, the determining, by the network side device, a target grant free resource based on the mobility information includes: when a location of the terminal device is fixed, determining, by the network side device, that the target grant free resource is the dedicated grant free resource; or when a location of the terminal device is unfixed, determining, by the network side device, that the target grant free resource is the universal target grant free resource. According to the foregoing technical solution, it can be ensured that no ID needs to be carried when the terminal device at a fixed location sends a data message to the network side device, thereby reducing a size of the data message.

With reference to the second aspect, in a second possible embodiment of the second aspect, the determining, by the network side device, a target grant free resource based on the mobility information includes: when a location of the terminal device is fixed or a location change of the terminal device is within a specified range, determining, by the network side device, that the target grant free resource is the dedicated grant free resource; or when a location change of the terminal device exceeds the specified range, determining, by the network side device, that the target grant free resource is the universal target grant free resource. According to the foregoing technical solution, it can be ensured that no ID needs to be carried when the terminal device at a relatively fixed location sends a data message to the network side device, thereby reducing a size of the data message.

With reference to the first possible embodiment of the second aspect or the second possible embodiment of the second aspect, in a third possible embodiment of the second aspect, when the target grant free resource determined by the network side device is the dedicated grant free resource, the method further includes: determining, by the network side device, a valid range of the dedicated grant free resource; and sending, by the network side device, the valid range to the terminal device. According to the foregoing technical solution, the valid range can be allocated to the dedicated grant free resource, thereby effectively controlling the dedicated grant free resource used by the terminal device.

With reference to any one of the second aspect or the foregoing possible embodiments of the second aspect, in a fourth possible embodiment of the second aspect, when the target grant free resource determined by the network side device is the dedicated grant free resource, the method further includes: receiving, by the network side device, a first data message by using the dedicated grant free resource; and determining, by the network side device, that data carried by the first data message is sent by the terminal device. According to the foregoing technical solution, the data message received by the network side device on the dedicated grant free resource does not include the ID allocated to the terminal device, thereby reducing a size of the data message.

With reference to any one of the second aspect or the first possible embodiment of the second aspect to the third possible embodiment of the second aspect, in a fifth possible embodiment of the second aspect, the method further includes: receiving, by the network side device, a second data message by using the universal grant free resource; determining, by the network side device, that an ID carried by the second data message is the first ID; and determining, by the network side device, that data carried by the second data message is sent by the terminal device. According to the foregoing technical solution, the network side device may receive, on the universal grant free resource, the data message sent by the terminal device, to avoid a case in which all grant free resources are grant free resources specified for use by the terminal device, causing exhaustion of the grant free resources.

With reference to any one of the second aspect or the foregoing possible embodiments of the second aspect, in a sixth possible embodiment of the second aspect, the obtaining, by the network side device, mobility information of the terminal device includes: receiving, by the network side device, the mobility information sent by the terminal device; or determining, by the network side device, the mobility information. Based on the foregoing technical solution, the network side device may obtain the mobility information sent by the terminal device or the network side device voluntarily determines the mobility information, to determine, based on the mobility information, a type of the target grant free resource to be allocated to the terminal device.

With reference to the sixth possible embodiment of the second aspect, in a seventh possible embodiment of the second aspect, the determining, by the network side device, the mobility information includes: receiving, by the network side device, a third data message by using the universal grant free resource, where the third data message carries the first ID; and determining, by the network side device, the mobility information based on the third data message. According to the foregoing technical solution, the network side device may determine the mobility information of the terminal device by using the data message sent by the terminal device, to determine, based on the mobility information, a type of the target grant free resource to be allocated to the terminal device.

According to a third aspect, an embodiment of this application provides a terminal device. The terminal device includes units configured to perform the first aspect or the possible embodiments of the first aspect.

According to a fourth aspect, an embodiment of this application provides a network side device. The network side device includes units configured to perform the second aspect or the possible implementations of the second aspect.

According to a fifth aspect, an embodiment of this application provides a terminal device. The terminal device includes a processor, a memory, and a transceiver. The memory is configured to store an instruction for implementing the method according to any one of the first aspect and the possible embodiments of the first aspect. The processor executes the instruction stored in the memory, to implement the method according to any one of the first aspect or the possible embodiments of the first aspect in combination with a communications interface.

According to a sixth aspect, an embodiment of this application provides a network side device. The network side device includes a processor, a memory, and a transceiver. The memory is configured to store an instruction for implementing the method according to any one of the second aspect and the possible embodiments of the second aspect. The processor executes the instruction stored in the memory, to implement the method according to any one of the second aspect or the possible embodiments of the second aspect in combination with a communications interface.

DESCRIPTION OF EMBODIMENTS

The following describes technical solutions in embodiments of this application with reference to the accompanying drawings.

A terminal device as described in the embodiments of this application may also be referred to as an access terminal, user equipment (UE), a subscriber unit, a subscriber station, a mobile station, a mobile console, a remote station, a remote terminal, a mobile device, a user terminal, a terminal, a wireless communications device, a user agent, a user apparatus, a handheld device having a wireless communication function, a computing device, another processing device connected to a wireless modem, an in-vehicle device, a wearable device, or a terminal device in a future 5G network.

A network side device may be an evolved NodeB (eNB) in an LTE system, a base station device in a future 5G network, a transmission and reception point (TRP), or the like.

A grant free resource described in the embodiments of this application may be a reference signal (RS) or may be a preamble.

A service scope of the network side device described in the embodiments of this application and an area in which the network side device provides a service are notification areas. The notification area may be one or more cells.

Data described in the embodiments of this application may be small data or common data. Small data means that a size of data transmitted by a terminal or a network is less than a threshold, for example, 100 bytes, and small data may be a packet, or a total length of a plurality of packets is less than a predetermined threshold.

Figure 1:
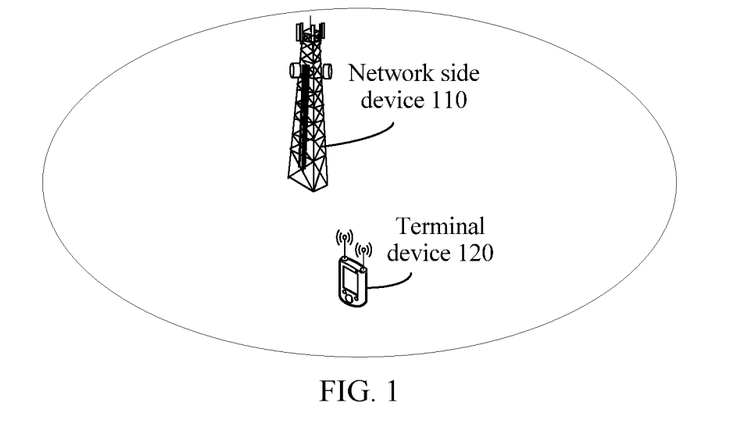
FIG. 1 is a schematic diagram of a terminal device and a network side device.

FIG. 1 is a schematic diagram of a terminal device and a network side device. As shown in FIG. 1, there is a terminal device 120 in an area in which a network side device 110 provides a service.

The embodiments of this application are described below with reference to FIG. 1.

Figure 2:
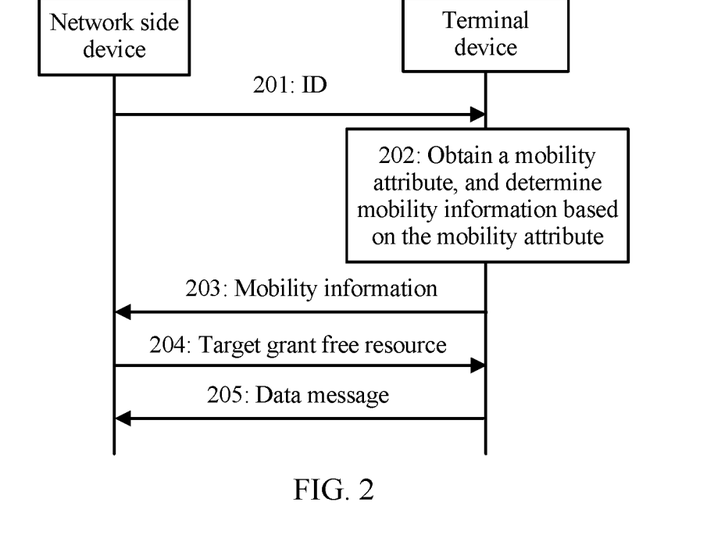
FIG. 2 is a schematic flowchart of a data transmission method according to an embodiment of this application.

FIG. 2 is a schematic flowchart of a data transmission method according to an embodiment of this application.

201: A network side device 110 sends an ID allocated to a terminal device 120 to the terminal device 120.

More specifically, if there are a plurality of terminal devices within a service scope of the network side device 110, an ID allocated by the network side device 110 to each of the plurality of terminal devices is unique. In other words, any two of the plurality of terminal devices have different IDs.

202: The terminal device 120 obtains a mobility attribute of the terminal device 120, and determines mobility information of the terminal device 120 based on the mobility attribute of the terminal device 120.

The mobility attribute of the terminal device indicates that the terminal device is a fixed terminal device or a movable terminal device. A fixed terminal device is a terminal device that is stationary at a location. For example, in a massive machine type communication (mMTC) scenario, some terminal devices are terminal devices fixedly installed at some particular locations. The terminal devices are fixed terminal devices. A movable terminal device is a terminal device that can be moved, for example, a mobile phone.

Optionally, in some embodiments, the mobility attribute of the terminal device may be used as an inherent attribute of the terminal device and stored or preset in the terminal device 120. In this way, the terminal device 120 may directly obtain the mobility attribute of the terminal device 120.

Optionally, in some other embodiments, the terminal device 120 may determine attribute information of the terminal device 120 by using information related to the mobility attribute. The information related to the mobility attribute may be a service type of the terminal device. For example, if the service type of the terminal device 120 indicates a service completed at a fixed location, for example, a meter reading service or an environmental monitoring service, it may be determined that the mobility attribute of the terminal device 120 indicates a fixed terminal device. If the service type of the terminal device 120 indicates a service completed at an unfixed location, for example, intelligent parking or intelligent tracking, it may be determined that the mobility attribute of the terminal device 120 indicates a movable terminal device.

Optionally, in some embodiments, if the terminal device 120 is a fixed terminal device, the mobility information of the terminal device 120 determined by the terminal device 120 is used to indicate that the terminal device 120 is a fixed terminal device. If the terminal device 120 is a movable terminal, the mobility information of the terminal device 102 determined by the terminal device 120 is used to indicate that the terminal device 120 is a movable terminal.

Optionally, in some other embodiments, if the terminal device 120 is a fixed terminal device, the mobility information of the terminal device 120 determined by the terminal device 120 may be used to instruct the network side device 110 to allocate a dedicated grant free resource to the terminal device 120. If the terminal device 120 is a movable terminal, the mobility information of the terminal device 120 determined by the terminal device 120 may be used to indicate that the network side device 110 does not need to allocate a dedicated grant free resource to the terminal device 120.

Optionally, in some other embodiments, the mobility information of the terminal device 120 determined by the terminal device 120 may be the information related to the mobility attribute. In this way, the network side device 110 may determine, based on the information related to the mobility attribute, the mobility attribute of the terminal device 120, and determine whether to allocate a dedicated grant free resource to the terminal device 120.

203: The terminal device 120 sends the mobility information of the terminal device 120 to the network side device 110.

204: The network side device 110 determines, based on the mobility information of the terminal device 120, a target grant free resource used by the terminal device 120, and indicates the target grant free resource to the terminal device 120.

205: The terminal device 120 communicates with the network side device 110 by using the target grant free resource.

Optionally, in some embodiments, if the mobility information of the terminal device 120 is used to indicate that the terminal device 120 is a fixed terminal device, the network side device 110 may determine a grant free resource in grant free resources as a dedicated grant free resource for the terminal device 120, and indicate the determined dedicated grant free resource as the target grant free resource to the terminal device 120. If the mobility information of the terminal device 120 is used to indicate that the terminal device 120 is a movable terminal, the network side device 110 may determine that the target grant free resource is a universal grant free resource, and indicate the universal grant free resource to the terminal device 120.

Optionally, in some other embodiments, if the mobility information of the terminal device 120 is used to instruct the network side device 110 to allocate a dedicated grant free resource to the terminal device 120, the network side device 110 may determine a grant free resource in grant free resources as a dedicated grant free resource for the terminal device 120, and indicate the determined dedicated grant free resource as the target grant free resource to the terminal device 120. If the mobility information of the terminal device 120 is used to indicate that the network side device 110 does not need to allocate a dedicated grant free resource to the terminal device 120, the network side device 110 may determine that the target grant free resource is a universal grant free resource, and indicate the universal grant free resource to the terminal device 120.

Optionally, in some other embodiments, if the mobility information of the terminal device 120 may be the information related to the mobility attribute, the network side device 110 may determine the mobility attribute of the terminal device 120 based on the information related to the mobility attribute. If the network side device 110 determines that the mobility attribute of the terminal device 120 indicates a fixed terminal device, the network side device 110 may determine a grant free resource in grant free resources as a dedicated grant free resource for the terminal device 120, and indicate the determined dedicated grant free resource as the target grant free resource to the terminal device 120. If the network side device 110 determines that the mobility attribute of the terminal device 120 indicates a movable terminal, the network side device 110 may determine that the target grant free resource is a universal grant free resource, and indicate the universal grant free resource to the terminal device 120.

The network side device 110 may indicate the target grant free resource in a plurality of manners.

Optionally, in an embodiment, the network side device 110 may divide grant free resources into resource pools, and each resource pool includes a plurality of grant free resources. Grant free resources included in one of two resource pools are all grant free resources that can be voluntarily selected by the terminal device (for ease of description, the resource pool is referred to as a universal grant free resource pool below), and grant free resources included in the other resource pool are grant free resources that can be allocated to a particular terminal device (for ease of description, the resource pool is referred to as a dedicated grant free resource pool below).

Optionally, in an embodiment, the network side device 110 may indicate specific resource information of a plurality of grant free resources included in the universal grant free resource pool to the terminal device in advance. The specific resource information of the grant free resource may include a time-frequency resource of the grant free resource, a transmission interval of the time-frequency resource, a set of corresponding and available orthogonal sequences (such as DMRSs) on each time-frequency resource, and the like. For example, the network side device 110 may indicate the specific resource information of the plurality of grant free resources included in the universal grant free resource pool to the terminal device when establishing a connection to the terminal device 120 or before step 205. In this way, if the target grant free resource is a universal grant free resource, when indicating the target grant free resource, the network side device 110 may instruct the terminal device 120 to use the grant free resource in the universal grant free resource pool. The terminal device 120 may select, from the plurality of grant free resources included in the universal grant free resource pool, a grant free resource that is used when the terminal device 120 sends a data message to the network side device 110. If the target grant free resource is a dedicated grant free resource allocated by the network side device 110 to the terminal device 120, the network side device 110 may indicate specific resource information of the allocated dedicated grant free resource to the terminal device 120. The terminal device 120 may send a data message to the network side device 110 by using the dedicated grant free resource allocated by the network side device 110.

Optionally, in another embodiment, the network side device 110 may indicate specific resource information of a plurality of grant free resources included in the universal grant free resource pool and specific resource information of a plurality of grant free resources included in the dedicated grant free resource pool to the terminal device in advance. For example, the network side device 110 may indicate the specific resource information of the plurality of universal grant free resources and the specific resource information of the plurality of grant free resources included in the dedicated grant free resource pool to the terminal device when establishing a connection to the terminal device 120 or before step 205. In this way, if the target grant free resource is a universal grant free resource, when indicating the target grant free resource, the network side device 110 may instruct the terminal device 120 to use a resource in the universal grant free resource pool. The terminal device 120 may select, from the plurality of grant free resources included in the universal grant free resource pool, a grant free resource that is used when the terminal device 120 sends a data message to the network side device 110. Each grant free resource in the dedicated grant free resource pool may have a corresponding index. If the target grant free resource is a dedicated grant free resource allocated by the network side device 110 to the terminal device 120, the network side device 110 may indicate an index corresponding to the allocated dedicated grant free resource to the terminal device 120. The terminal device 120 may determine, based on the index, the dedicated grant free resource allocated by the network side device 110, and send a data message to the network side device 110 by using the dedicated grant free resource allocated by the network side device 110.

Optionally, in an embodiment, the terminal device 120 may store or preset specific resource information of one or more grant free resources. The stored or preset grant free resource is a universal grant free resource.

Optionally, in an embodiment, the network side device 110 may not distinguish between a time-frequency resource of a grant free resource that can be allocated to a particular terminal device and a time-frequency resource of a grant free resource that can be selected by a terminal device. The network side device 110 may indicate time-frequency resources of all grant free resources, a transmission interval of the time-frequency resource, one corresponding and available group of orthogonal sequences on the time-frequency resource, and the like to the terminal device in advance. For example, the network side device 110 may indicate the time-frequency resources of all the grant free resources to the terminal device when establishing a connection to the terminal device 120 or before step 205. In addition, the network side device 110 may divide corresponding and available orthogonal sequences on the time-frequency resources into two groups, and one group of orthogonal sequences are orthogonal sequences available for the universal grant free resource, and the other group of orthogonal sequences are orthogonal sequences reserved for the dedicated grant free resource. The network side device 110 may pre-send the orthogonal sequences available for the universal grant free resource to the terminal device when establishing a connection to the terminal device 120 or before step 205. The network side device 110 does not send the orthogonal sequences reserved for the dedicated grant free resource to the terminal device. When the network side device 110 allocates a particular grant free resource to one or more particular terminal devices, the network device 110 may select one of the reserved orthogonal sequences, and select a grant free time-frequency resource or a time-frequency resource index to indicate to the terminal device 120. The terminal device 120 performs transmission on a specified grant free time-frequency resource by using an allocated sequence. If use of a dedicated grant free time-frequency resource is not distinguished from use of a universal grant free time-frequency resource, because the ID allocated to the terminal device 120 does not need to be carried in dedicated grant free transmission, different modulation and coding schemes (MCS) may be configured for a user to improve transmission performance of the user.

If the target grant free resource is a dedicated grant free resource, the terminal device 120 sends a data message to the network side device 110 by using the dedicated grant free resource, and the data message sent by the terminal device 120 to the network side device 110 includes data sent by the terminal device 120. The data message sent by the terminal device to the network side device 110 does not need to include the ID allocated by the network side device 110 to the terminal device 120. In this way, if the terminal device 110 receives the data message on the dedicated grant free resource, the terminal device 110 may determine that a transmit end of the data message is the terminal device 120.

If the target grant free resource is a universal grant free resource, the terminal device 120 sends a data message to the network side device 110 by using the universal grant free resource, and the data message sent by the terminal device 120 to the network side device 110 includes data sent by the terminal device 120 and the ID allocated by the network side device 110 to the terminal device 120. In this way, after receiving the data message on the universal grant free resource, the terminal device 110 may determine, based on the ID carried by the data message, that a transmit end of the data message is the terminal device 120.

The data message mentioned in this embodiment of this application may also be referred to as a data packet, a packet, data, or the like. For ease of description, data information sent by using a dedicated grant free resource and carrying no ID allocated to a terminal device is referred to as first data below, and data information sent by using a universal grant free resource and carrying an ID allocated to a terminal device is referred to as second data below.

Numbers of the steps in the embodiment shown in FIG. 2 are merely intended to conveniently describe the embodiment shown in FIG. 2, rather than limit an order of the steps in the embodiment shown in FIG. 2.

It may be understood that, before the terminal device 120 sends the data message to the network side device 110 by using the target grant free resource, the terminal device 120 may need to establish a connection to the network side device 110. Step 201, step 203, and step 204 may all be performed in a connection establishment process. Certainly, one or all of step 201, step 203, and step 204 may also be performed after a connection is fully established.

If step 203 is performed after the connection is fully established, the terminal device 120 may first send the mobility information of the terminal device 120 to the network side device 110 by using the universal grant free resource.

According to the technical solution shown in FIG. 2, the network side device may allocate, depending on whether the terminal device is fixed, a corresponding grant free resource to the terminal device. According to the technical solution shown in FIG. 2, it can be ensured that no ID needs to be carried when the terminal device at a fixed location sends a data message to the network side device, thereby reducing a size of the data message. In addition, according to the technical solution shown in FIG. 2, it can be further ensured that a case in which grant free resources are exhausted and some terminal devices cannot send data messages to the network side device by using the grant free resources is avoided.

Optionally, in some embodiments, when the target grant free resource is a dedicated grant free resource, the network side device 110 may further send a valid range of the target grant free resource to the terminal device 120. The valid range may be a valid time of the dedicated grant free resource. In this case, the terminal device 120 may determine whether the valid range is exceeded, and if the valid range is not exceeded, may send first data to the network side device 110 by using the dedicated grant free resource; or if the valid range is exceeded, may send second data to the network side device 110 by using the universal grant free resource.

Further, in some embodiments, when the terminal device 120 determines to move to a service scope of another network side device from the service scope of the network side device 110, the terminal 120 re-obtains an ID allocated by the another network side device to the terminal device 120, and obtain a target grant free resource indicated by the another network side device. In addition, after determining to move to the service scope of the another network side device from the service scope of the network side device 110 and before obtaining the ID allocated by the another network side device to the terminal device 120, the terminal device 120 does not communicate with the another network side device by using the ID allocated by the network side device 110 to the terminal device 120. A specific process in which the terminal 120 re-obtains the ID allocated by the another network side device to the terminal device 120, and obtain the target grant free resource indicated by the another network side device is the same as the process shown in FIG. 2. Details do not need to be described herein again.

Optionally, in some embodiments, assuming that the terminal device 120 is a fixed terminal device, if a location of the terminal device 120 changes, a grant free resource for data transmission needs to be reconfigured. In other words, the steps shown in FIG. 2 need to be performed again.

Figure 3:
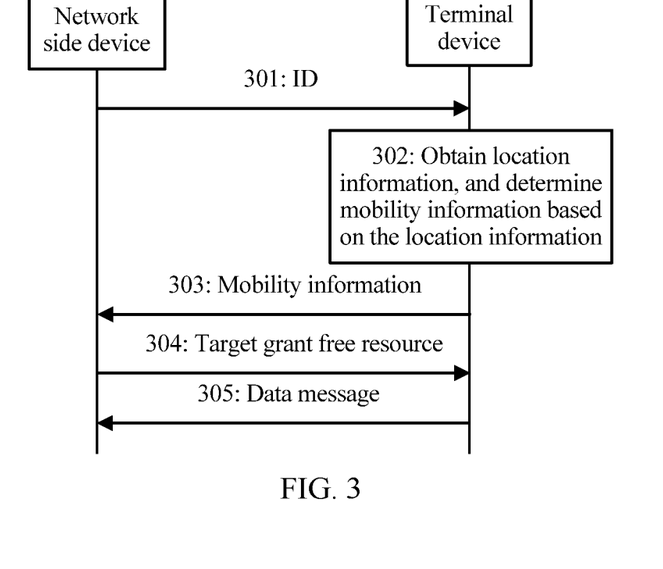
FIG. 3 is a schematic flowchart of a data transmission method according to an embodiment of this application.

FIG. 3 is a schematic flowchart of a data transmission method according to an embodiment of this application.

301: A network side device 110 sends an ID allocated to a terminal device 120 to the terminal device 120.

302: The terminal device 120 obtains location information of the terminal device 120, and determines mobility information of the terminal device 120 based on the location information of the terminal device 120.

303: The terminal device 120 sends the mobility information of the terminal device 120 to the network side device 110.

The location information of the terminal device may be geographic information of the terminal device, or the location information of the terminal device may be information that can reflect a terminal location and/or a location change, for example, an ID of a cell in which the terminal device is located, or a reference signal of a cell in which the terminal device is located.

Optionally, in some embodiments, the terminal device 120 may determine a mobility attribute of the terminal device based on the location information, and the mobility information sent by the terminal device 120 to the network side device 110 is used to indicate the mobility attribute of the terminal device 120. More specifically, if the terminal device 120 determines, based on the location information, that a location of the terminal device 120 is fixed or a location change of the terminal device 120 is within a specified range, the terminal device 120 may determine that the mobility attribute of the terminal device 120 indicates a fixed terminal device. If the terminal device 120 determines, based on the location information, that the location change of the terminal device 120 exceeds the specified range, the terminal device 120 may determine that the mobility attribute of the terminal device 120 indicates a movable terminal device. If the terminal device 120 determines that the terminal device 120 is a fixed terminal device, the mobility information sent by the terminal device 120 to the network side device 110 is used to indicate that the terminal device 120 is a fixed terminal device. If the terminal device 120 determines that the terminal device 120 is a movable terminal device, the mobility information sent by the terminal device 120 to the network side device 110 is used to indicate that the terminal device 120 is a movable terminal device.

For example, the location information may be a geographic location. The terminal device 120 may determine the geographic location of the terminal device 120 by using a satellite positioning technology or another positioning technology. The terminal device 120 may determine geographic locations of the terminal device 120 a plurality of times within a period of time. If the geographic locations determined the plurality of times remain unchanged or a change range of the geographic locations is within a preset change range, the terminal device 120 may determine that the mobility attribute of the terminal device 120 indicates a fixed terminal device. If the geographic location of the terminal device 120 changes and a change range exceeds the preset change range, the terminal device 120 may determine that the mobility attribute of the terminal device 120 indicates a movable terminal device.

For another example, the location information may be an ID of a cell in which the terminal device is located. The terminal device 120 may determine whether the ID of the cell in which the terminal device 120 is located changes within a period of time. If the terminal device 120 determines that the ID of the cell in which the terminal device 120 is located is not changed or a change range is within a particular range, the terminal device 120 may consider that the terminal device 120 is a fixed terminal device. If the terminal device 120 determines that the change range of the ID of the cell in which the terminal device 120 is located exceeds the particular range, the terminal device 120 may determine that the terminal device 120 is an unfixed terminal.

Similarly, the terminal device 120 may also determine the mobility attribute of the terminal device based on some other information that can reflect the location of the terminal device and/or the location change of the terminal device, for example, a moving speed of the terminal device 120, or a reference signal of the cell in which the terminal device 120 is located. To avoid redundancy, examples are not listed herein one by one.

Optionally, in some embodiments, the terminal device 120 may determine the mobility information based on the obtained location information. The mobility information includes the location information obtained by the terminal device 120. In this case, the network side device 110 may determine the mobility attribute of the terminal device 120 based on the location information of the terminal device 120 included in the mobility information. A specific embodiment in which the network side device 110 determines the mobility attribute of the terminal device 120 based on the location information of the terminal device 120 is the same as a specific embodiment in which the terminal device 120 voluntarily determines the mobility attribute of the terminal device 120 based on the location information of the terminal device 120. Details do not need to be described herein again.

304: The network side device 110 determines, based on the mobility information of the terminal device 120, a target grant free resource used by the terminal device 120, and indicates the target grant free resource to the terminal device 120.

305: The terminal device 120 communicates with the network side device 110 by using the target grant free resource.

If the mobility information of the terminal device 120 is used to indicate that the terminal device 120 is a fixed terminal device, the network side device 110 may determine a grant free resource in grant free resources as a dedicated grant free resource for the terminal device 120, and indicate the determined dedicated grant free resource as the target grant free resource to the terminal device 120.

If the mobility information of the terminal device 120 is used to indicate that the terminal device 120 is a movable terminal, the network side device 110 may determine that the target grant free resource is a universal grant free resource, and indicate the universal grant free resource to the terminal device 120.

If the mobility information of the terminal device 120 includes the location information of the terminal device 120, the network side device 110 determines, based on the location information of the terminal device 120, that the terminal device 120 is a fixed terminal device or a movable terminal device, and determines the target grant free resource based on a determining result.

If the network side device 110 determines, based on the location information of the terminal device 120, that the terminal device 120 is a fixed terminal device, the network side device 110 may determine a grant free resource in grant free resources as a dedicated grant free resource for the terminal device 120, and indicate the determined dedicated grant free resource as the target grant free resource to the terminal device 120.

If the network side device 110 determines, based on the location information of the terminal device 120, that the terminal device 120 is a movable terminal device, the network side device 110 may determine that the target grant free resource is a universal grant free resource, and indicate the universal grant free resource to the terminal device 120.

A manner of indicating, by the network side device 110, the target grant free resource to the terminal device 120 and a specific process in which the terminal device 120 sends data information to the network side device 110 by using the target grant free resource are similar to those in the embodiment shown in FIG. 2. Details do not need to be described herein again.

According to the technical solution shown in FIG. 3, if the location of the terminal device is relatively fixed, no ID needs to be carried when the terminal device sends a data message to the network side device, to reduce a size of the data message. In addition, according to the technical solution shown in FIG. 3, it can be further ensured that a case in which grant free resources are exhausted and some terminal devices cannot send data messages to the network side device by using the grant free resources is avoided.

Optionally, in some embodiments, when the target grant free resource is a dedicated grant free resource, the network side device 110 may further send a valid range of the target grant free resource to the terminal device 120.

Optionally, in some embodiments, the valid range may include a valid time of the dedicated grant free resource. In this case, the terminal device 120 may determine whether a current time exceeds the valid time, and if the valid time is not exceeded, may send first data to the network side device 110 by using the dedicated grant free resource, or if the valid time is exceeded, may send second data to the network side device 110 by using the universal grant free resource.

Optionally, in some other embodiments, the valid range may include a valid location range of the dedicated grant free resource. The valid location range may be a range of a geographic location, or may be one or more cells, or one or more sectors of a cell. In this case, the terminal device 120 may determine whether the valid location range is exceeded, and if the valid location range is not exceeded, may send first data to the network side device 110 by using the dedicated grant free resource; or if the valid location range is exceeded, may send second data to the network side device 110 by using the universal grant free resource.

Certainly, in some other embodiments, the valid range may include both a valid time and a valid location range. When a current time exceeds the valid time and/or the location of the terminal device 120 exceeds the valid location range, the terminal device 120 sends second data to the network side device 110 by using the universal grant free resource. The terminal device 120 may use the dedicated grant free resource to send first data to the network side device 110 only when the current time does not exceed the valid time and/or the location of the terminal device 120 does not exceed the valid location range.

In the embodiment shown in FIG. 3, before the terminal device 120 obtains the target grant free resource, the terminal device 120 may send the second data to the network side device 110 by using the universal grant free resource.

Further, in some embodiments, when the terminal device 120 determines to move to a service scope of another network side device from a service scope of the network side device 110, the terminal 120 re-obtains an ID allocated by the another network side device to the terminal device 120, and obtain a target grant free resource indicated by the another network side device. In addition, after determining to move to the service scope of the another network side device from the service scope of the network side device 110 and before obtaining the ID allocated by the another network side device to the terminal device 120, the terminal device 120 does not communicate with the another network side device by using the ID allocated by the network side device 110 to the terminal device 120. A specific process in which the terminal 120 re-obtains the ID allocated by the another network side device to the terminal device 120, and obtain the target grant free resource indicated by the another network side device is the same as the process shown in FIG. 2. Details do not need to be described herein again.

Figure 4:
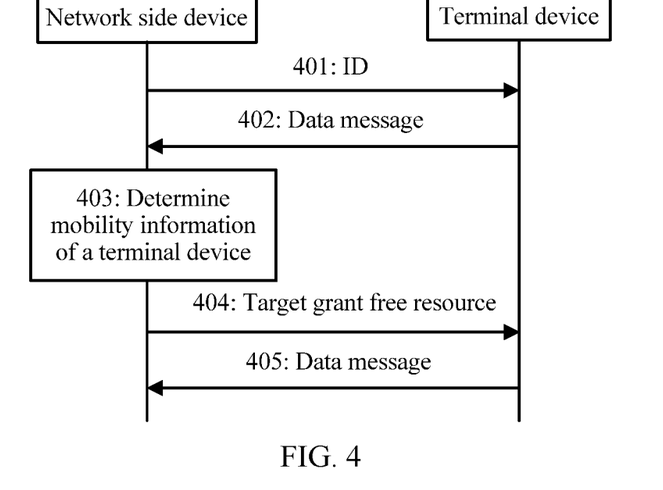
FIG. 4 is a schematic flowchart of a data transmission method according to an embodiment of this application.

FIG. 4 is a schematic flowchart of a data transmission method according to an embodiment of this application.

401: A network side device 110 sends an ID allocated to a terminal device 120 to the terminal device 120.

402: The terminal device 120 sends a data message to the network side device 110 by using a universal grant free resource, where the data message sent by the terminal device 120 to the network side device 110 includes data sent by the terminal device 120 and the ID allocated by the network side device 110 to the terminal device 120.

For a manner of obtaining the universal grant free resource by the terminal device 120, refer to the embodiment shown in FIG. 2. Details do not need to be described herein again.

403: The network side device 110 may determine mobility information of the terminal device 120 based on the data message.

Optionally, in some embodiments, the data message may reflect information of the terminal device 110 related to a mobility attribute. For example, the network side device 110 may determine a service type of the terminal device 120 based on the data message, and determines the mobility attribute of the terminal device 120 based on the service type of the terminal device 120, to determine the mobility information of the terminal device 120. For example, if the service type of the terminal device 120 indicates a service completed at a fixed location, for example, a meter reading service or an environmental monitoring service, it may be determined that the mobility attribute of the terminal device 120 indicates a fixed terminal device. If the service type of the terminal device 120 indicates a service completed at an unfixed location, for example, intelligent parking or intelligent tracking, it may be determined that the mobility attribute of the terminal device 120 indicates a movable terminal device. The mobility information determined by the network side device 110 may be the mobility attribute of the terminal device 120.

Optionally, in some other embodiments, the network side device 110 may determine one or more of geographic location information, a moving speed, and a moving range of the terminal device 120 based on the data message sent by the terminal device 120. These pieces of information are the mobility information of the terminal device 120.

404: The network side device 110 determines, based on the mobility information of the terminal device 120, a target grant free resource used by the terminal device 120, and indicates the target grant free resource to the terminal device 120.

For a specific embodiment in which the mobility information is the mobility attribute of the terminal device 120, refer to the embodiment shown in FIG. 2 or FIG. 3. Details do not need to be described herein again.

Optionally, in some embodiments, when the mobility information is one or more of geographic location information, a moving speed, and a moving range, the network side device 110 may determine the mobility attribute of the terminal device based on the mobility information, and determine the target grant free resource based on the mobility attribute of the terminal device. For a specific embodiment in which the network side device 110 determines the target grant free resource based on the mobility attribute of the terminal device, also refer to the embodiment shown in FIG. 3. Details do not need to be described herein.

Optionally, in some other embodiments, when the mobility information is one or more of geographic location information, a moving speed, and a moving range, the network side device 110 may determine the target grant free resource based on one or more of the geographic location information, the moving speed, and the moving range.

The geographic location information is used as an example. If geographic locations determined a plurality of times remain unchanged or a change range of the geographic locations is within a preset change range, the network side device 110 may determine a grant free resource in grant free resources as a dedicated grant free resource for the terminal device 120. If the geographic location of the terminal device 120 changes and a change range exceeds the preset change range, the network side device 110 may determine that the target grant free resource is a universal grant free resource.

In the foregoing embodiment, when the network side device 110 determines the target grant free resource based on the geographic location information, the moving speed, and the moving range, the network side device 110 uses a generalized mobility determining criterion. In other words, even if the terminal device moves, provided that the moving range of the terminal device is within a specified range, a grant free resource may be determined in grant free resources as a dedicated grant free resource for the terminal device.

In some other embodiments, when the network side device 110 determines the target grant free resource based on the geographic location information, the moving speed, and the moving range, the network side device 110 may alternatively use a narrowly defined mobility determining criterion. To be specific, provided that the geographic location information of the terminal device changes or the terminal device moves, it may be considered that the terminal device is a movable terminal device and it is determined that the target grant free resource is a universal grant free resource. A grant free resource may be determined in grant free resources as the dedicated grant free resource for the terminal device only when the location of the terminal device remains unchanged.

405: The terminal device 120 communicates with the network side device 110 by using the target grant free resource.

Step 404 and step 405 are similar to the methods shown in FIG. 2 and FIG. 3. Details do not need to be described herein again.

According to the technical solution shown in FIG. 4, the network side device can voluntarily determine the mobility information of the terminal device. If the location of the terminal device is relatively fixed, no ID needs to be carried when the terminal device sends a data message to the network side device, to reduce a size of the data message. In addition, according to the technical solution shown in FIG. 4, it can be further ensured that a case in which grant free resources are exhausted and some terminal devices cannot send data messages to the network side device by using the grant free resources is avoided.

It may be understood that, in the solution shown in FIG. 4, the network side device 110 determines the mobility information of the terminal device 120 by using the data message that is sent by the terminal device 120 by using the universal grant free resource. Therefore, it may be considered that the terminal device 120 indicates the mobility information of the terminal device 120 to the network side device 110 by sending the data message to the network side device 110.

In addition, similar to the method shown in FIG. 3, in some embodiments, when the target grant free resource is a dedicated grant free resource, the network side device 110 may further send a valid range of the target grant free resource to the terminal device 120. For specific descriptions, refer to the descriptions of the foregoing method. Details do not need to be described herein again.

Further, in some embodiments, when the terminal device 120 determines to move to a service scope of another network side device from a service scope of the network side device 110, the terminal 120 re-obtains an ID allocated by the another network side device to the terminal device 120, and obtain a target grant free resource indicated by the another network side device. In addition, after determining to move to the service scope of the another network side device from the service scope of the network side device 110 and before obtaining the ID allocated by the another network side device to the terminal device 120, the terminal device 120 does not communicate with the another network side device by using the ID allocated by the network side device 110 to the terminal device 120. A specific process in which the terminal 120 re-obtains the ID allocated by the another network side device to the terminal device 120, and obtain the target grant free resource indicated by the another network side device is the same as the process shown in FIG. 2. Details do not need to be described herein again.

Figure 5:
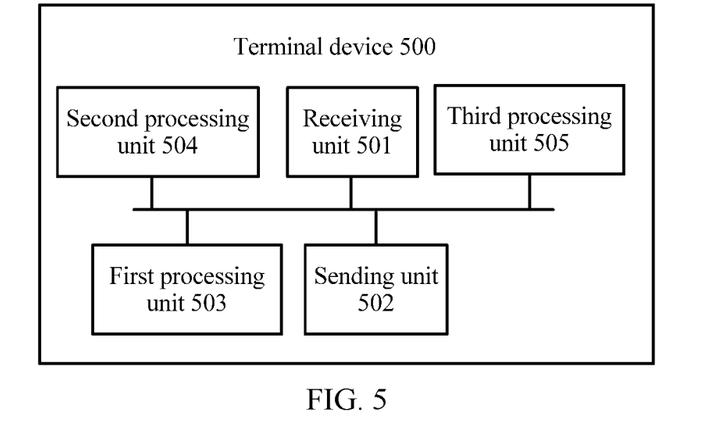
FIG. 5 is a structural block diagram of a terminal device according to an embodiment of this application.

FIG. 5 is a structural block diagram of a terminal device according to an embodiment of this application. As shown in FIG. 5, the terminal device 500 includes a receiving unit 501 and a sending unit 502.

The receiving unit 501 is configured to receive a first identifier ID, where the first ID is an ID allocated by a first network side device to the terminal device 500, the terminal device 500 is located in a first area, the first area is an area in which the first network side device provides a service, and the first ID is valid in the first area.

The sending unit 502 is configured to indicate mobility information of the terminal device 501 to the first network side device.

The receiving unit 501 is further configured to receive target grant free information indicated by the first network side device, where the target grant free resource is a dedicated grant free resource or a universal grant free resource, data information sent by the sending unit 502 to the first network side device by using the dedicated grant free resource includes data sent by the terminal device 500, and data information sent by the sending unit 502 to the first network side device by using the universal grant free resource includes data sent by the terminal device 500 and the first ID.

The terminal device 500 may further include a first processing unit 503, a second processing unit 504, and a third processing unit 505. The first processing unit 503 is configured to determine the mobility information. The second processing unit 504 is configured to determine that the terminal device 500 is located in the first area. The third processing unit 503 is configured to determine that the terminal device 500 is to move to the first area from a second area.

For operations and functions of the receiving unit 501, the sending unit 502, the first processing unit 503, the second processing unit 504, and the third processing unit 505 of the terminal device 1200, refer to the descriptions in the foregoing methods. To avoid repetition, details are not described herein again.

The first processing unit 503 may be implemented by a processor. The second processing unit 504 and the third processing unit 505 may be implemented by a processor and/or a chip used for positioning. The receiving unit 501 and the sending unit 502 may be implemented by a transceiver.

Figure 6:
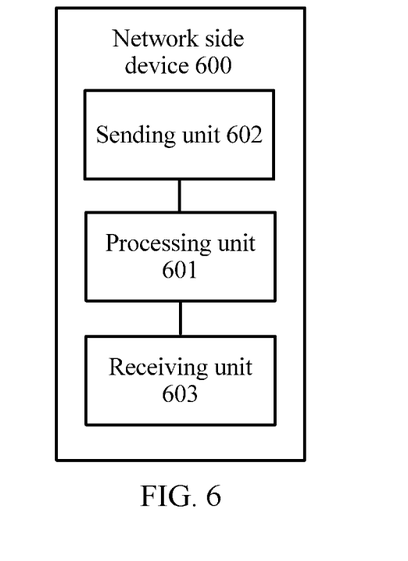
FIG. 6 is a structural block diagram of a network side device according to an embodiment of this application.

FIG. 6 is a structural block diagram of a network side device according to an embodiment of this application. As shown in FIG. 6, the network side device 600 includes a processing unit 601, a sending unit 602, and a receiving unit 603.

The processing unit 601 is configured to allocate a first identifier ID to a terminal device, where the terminal device is located in a first area, the first area is an area in which the network side device 600 provides a service, and the first ID is valid in the first area.

The processing unit 601 is further configured to obtain mobility information of the terminal device.

The processing unit 601 is further configured to determine a target grant free resource based on the mobility information, where the target grant free resource is a dedicated grant free resource or a universal grant free resource, data information received by the receiving unit 603 by using the universal grant free resource includes data and an ID of a terminal device sending the data, and data information received by the receiving unit 603 by using the dedicated grant free resource includes data.

The sending unit 602 is configured to indicate the target grant free resource to the terminal device.

For operations and functions of the processing unit 601, the sending unit 602, and the receiving unit 603 of the network side device 600, refer to the descriptions in the foregoing methods. To avoid repetition, details are not described herein again.

The processing unit 601 may be implemented by a processor, and the sending unit 602 and the receiving unit 603 may be implemented by a transceiver.

Figure 7:
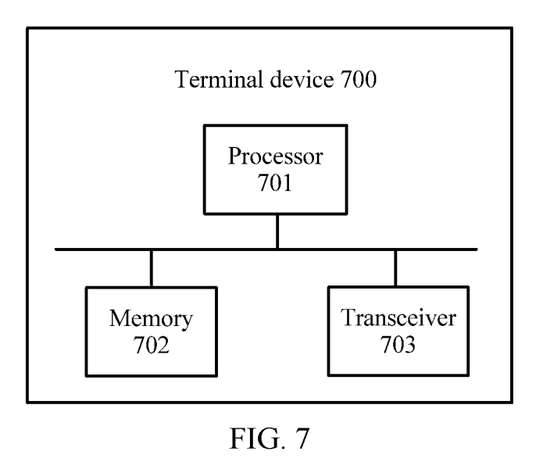
FIG. 7 is a structural block diagram of a terminal device according to an embodiment of this application.

FIG. 7 is a structural block diagram of a terminal device according to an embodiment of this application. The terminal device 700 shown in FIG. 7 includes a processor 701, a memory 702, and a transceiver 703.

The components in the terminal device 700 communicate with each other by using internal connection paths, to transfer a control and/or data signal.

The methods disclosed in the foregoing embodiment of this application may be applied to the processor 701, or implemented by the processor 701. The processor 701 may be an integrated circuit chip and has a signal processing capability. In embodiments, operations in the foregoing methods can be implemented by using a hardware integrated logical circuit in the processor 701, or by using instructions in a form of software. The processor 701 may be a general purpose processor, a digital signal processor (DSP), an application-specific integrated circuit (ASIC), a field programmable gate array (FPGA) or another programmable logical device, a discrete gate or transistor logic device, or a discrete hardware component. It may implement or perform the methods, the operations, and logical block diagrams that are disclosed in the embodiments of this application. The general purpose processor may be a microprocessor, or the processor may be any conventional processor or the like. Operations of the methods disclosed with reference to the embodiments of this application may be directly performed and accomplished by using a hardware decoding processor, or may be performed and accomplished by using a combination of hardware and software modules in the decoding processor. The software module may be located in a mature storage medium in the art such as a random access memory (RAM), a flash memory, a read-only memory (ROM), a programmable read-only memory, an electrically erasable programmable memory, or a register. The storage medium is located in the memory 702. The processor 701 reads an instruction in the memory 702, to implement, in combination with the transceiver 703, the operations performed by the terminal device in the foregoing methods.

In some embodiments, the terminal device 700 may further include a chip used for positioning. The chip may determine a location of the terminal device by using a technology such as a global positioning system (GPS).

It may be understood that, in addition to the processor 701, the memory 702, and the transceiver 703 shown in FIG. 7, the terminal device 700 should further include some necessary apparatuses such as an antenna, a display, and an input apparatus. To avoid redundancy, the foregoing apparatuses are not shown in FIG. 7.

Figure 8:
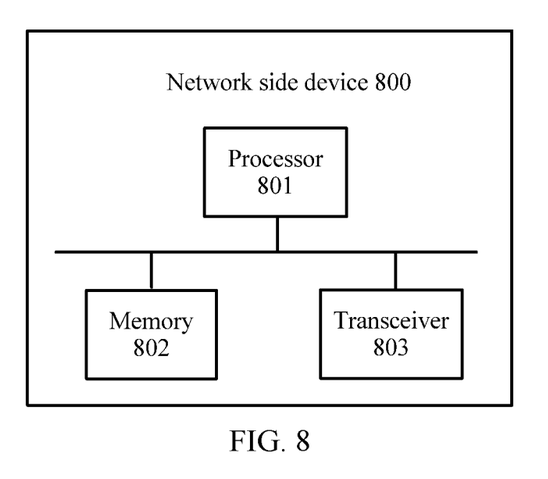
FIG. 8 is a structural block diagram of a network side device according to an embodiment of this application.

FIG. 8 is a structural block diagram of a network side device according to an embodiment of this application. The network side device 800 shown in FIG. 8 includes a processor 801, a memory 802, and a transceiver 803.

The components in the network side device 800 communicate with each other by using internal connection paths, to transfer a control and/or data signal.

The methods disclosed in the foregoing embodiment of this application may be applied to the processor 801, or implemented by the processor 801. The processor 801 may be an integrated circuit chip and has a signal processing capability. In embodiments, operations in the foregoing methods can be implemented by using a hardware integrated logical circuit in the processor 801, or by using instructions in a form of software. The processor 801 may be a general purpose processor, a DSP, an ASIC, an FPGA or another programmable logical device, a discrete gate or transistor logic device, or a discrete hardware component. It may implement or perform the methods, the operations, and logical block diagrams that are disclosed in the embodiments of this application. The general purpose processor may be a microprocessor, or the processor may be any conventional processor or the like. Operations of the methods disclosed with reference to the embodiments of this application may be directly performed and accomplished by using a hardware decoding processor, or may be performed and accomplished by using a combination of hardware and software modules in the decoding processor. The software module may be located in a mature storage medium in the art such as a RAM, a flash memory, a ROM, a programmable read-only memory, an electrically erasable programmable memory, or a register. The storage medium is located in the memory 802. The processor 801 reads an instruction in the memory 802, to implement, in combination with the transceiver 803, the operations performed by the network side device in the foregoing methods.

It may be understood that, in addition to the processor 801, the memory 802, and the transceiver 803 shown in FIG. 8, the network side device 800 should further include some necessary apparatuses such as an antenna, a cyclic prefix remover, and a fast Fourier transformation processor. To avoid redundancy, the foregoing apparatuses are not shown in FIG. 8.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network side device, or the like) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   receiving, by a terminal device, a first identifier (ID), wherein the first ID is an ID allocated by a first network side device to the terminal device, the terminal device is located in a first area in which the first network side device provides a service, and the first ID is valid in the first area;
   indicating, by the terminal device, mobility information of the terminal device to the first network side device, the mobility information comprising a terminal device mobility attribute indicative of the terminal device being a fixed terminal device or a moveable terminal device;
   receiving, by the terminal device, target grant free information indicated by the first network side device, wherein a target grant free resource is a dedicated grant free resource when the terminal device mobility attribute is indicative of the terminal device being the fixed terminal device or a universal grant free resource when the terminal device mobility attribute is indicative of the terminal device being the moveable terminal device, and a target grant free resource type is selected by the first network side device based on the mobility information; and
   sending, by the terminal device, data information to the first network side device based on the target grant free information, wherein data information sent by the terminal device to the first network side device using the dedicated grant free resource comprises data sent by the terminal device, and data information sent by the terminal device to the first network side device using the universal grant free resource comprises data sent by the terminal device and the first ID, wherein when the target grant free resource is the dedicated grant free resource, the method further comprises:
   receiving, by the terminal device, a valid range of the target grant free resource that is sent by the first network side device;
   determining, by the terminal device, whether the valid range of the target grant free resource is exceeded;
   when the valid range of the target grant free resource is not exceeded, sending second data information to the first network side device using the dedicated grant free resource, wherein the second data information comprises data sent by the terminal device; and
   when the valid range of the target grant free resource is exceeded, sending third data information to the first network side device using the universal grant free resource, wherein the third data information comprises data sent by the terminal device and the first ID.

2. The method according to claim 1, wherein the indicating, by the terminal device, mobility information of the terminal device to the first network side device comprises:
   determining, by the terminal device, the mobility information, and sending the mobility information to the first network side device; or
   sending, by the terminal device, first data information to the first network side device, wherein the first data information comprises the first ID and data sent by the terminal device.

3. The method according to claim 2, wherein the determining, by the terminal device, the mobility information comprises:
   obtaining, by the terminal device, status information of the terminal device, wherein the status information of the terminal device comprises location information of the terminal device and/or a mobility attribute of the terminal device; and
   determining, by the terminal device, the mobility information of the terminal device based on the status information of the terminal device.

4. The method according to claim 1, wherein the method further comprises:
   when determining that the target grant free resource is the dedicated grant free resource, sending, by the terminal device, second data information to the first network side device using the dedicated grant free resource, wherein the second data information comprises data sent by the terminal device; or
   when determining that the target grant free resource is the universal grant free resource, sending, by the terminal device, third data information to the first network side device using the universal grant free resource, wherein the third data information comprises data sent by the terminal device and the first ID.

5. The method according to claim 1, wherein before the sending, by the terminal device, the third data information to the first network side device using the universal grant free resource, the method further comprises:
   determining, by the terminal device, that the terminal device is located in the first area.

6. The method according to claim 1, wherein before the indicating, by the terminal device, mobility information of the terminal device to the first network side device, the method further comprises:

determining, by the terminal device, to move to the first area from a second area, wherein a second network side device provides a service in the second area.

7. A data transmission method, comprising:
allocating, by a network side device, a first identifier (ID) to a terminal device, wherein the terminal device is located in a first area in which the network side device provides a service, and the first ID is valid in the first area;
obtaining, by the network side device, mobility information of the terminal device, the mobility information comprising a terminal device mobility attribute indicative of the terminal device being a fixed terminal device or a moveable terminal device;
determining, by the network side device, a target grant free resource based on the mobility information, wherein the target grant free resource is determined to be a dedicated grant free resource when the terminal device mobility attribute is indicative of the terminal device being the fixed terminal device or determined to be a universal grant free resource when the terminal device mobility attribute is indicative of the terminal device being the moveable terminal device, and wherein data information received by the network side device using the universal grant free resource comprises data and an ID of the terminal device sending the data, and data information received by the terminal device using the dedicated grant free resource comprises data, wherein the determining, by the network side device, the target grant free resource based on the mobility information comprises:
when a location of the terminal device is fixed or a location change of the terminal device is within a specified range, determining, by the network side device, that the target grant free resource is the dedicated grant free resource, and when the target grant free resource determined by the network side device is the dedicated grant free resource, the method further comprises: determining, by the network side device, a valid range of the dedicated grant free resource and sending, by the network side device, the valid range to the terminal device, and
when a location change of the terminal device exceeds the specified range, determining, by the network side device, that the target grant free resource is the universal target grant free resource; and
indicating, by the network side device, the target grant free resource to the terminal device.

8. The method according to claim 7, wherein the determining, by the network side device, the target grant free resource based on the mobility information comprises:
when a location of the terminal device is fixed, determining, by the network side device, that the target grant free resource is the dedicated grant free resource; and
when a location of the terminal device is unfixed, determining, by the network side device, that the target grant free resource is the universal target grant free resource.

9. The method according to claim 8, wherein when the target grant free resource determined by the network side device is the dedicated grant free resource, the method further comprises:
receiving, by the network side device, a first data message using the dedicated grant free resource; and
determining, by the network side device, that data carried by the first data message is sent by the terminal device.

10. The method according to claim 8, wherein the method further comprises:
receiving, by the network side device, a second data message using the universal grant free resource;
determining, by the network side device, that an ID carried by the second data message is the first ID; and
determining, by the network side device, that data carried by the second data message is sent by the terminal device.

11. The method according to claim 7, wherein the obtaining, by the network side device, mobility information of the terminal device comprises:
receiving, by the network side device, the mobility information sent by the terminal device; or
determining, by the network side device, the mobility information.

12. The method according to claim 11, wherein the determining, by the network side device, the mobility information comprises:
receiving, by the network side device, a third data message using the universal grant free resource, wherein the third data message carries the first ID; and
determining, by the network side device, the mobility information based on the third data message.

13. A terminal device, comprising:
a receiving unit configured to receive a first identifier (ID), wherein the first ID is an ID allocated by a first network side device to the terminal device, the terminal device is located in a first area in which the first network side device provides a service, and the first ID is valid in the first area;
a sending unit configured to indicate mobility information of the terminal device to the first network side device, the mobility information comprising a terminal device mobility attribute indicative of the terminal device being a fixed terminal device or a moveable terminal device;
the receiving unit is further configured to receive target grant free information indicated by the first network side device, wherein a target grant free resource is a dedicated grant free resource when the terminal device mobility attribute is indicative of the terminal device being the fixed terminal device or a universal grant free resource when the terminal device mobility attribute is indicative of the terminal device being the moveable terminal device, and a target grant free resource type is selected by the first network side device based on the mobility information; and
the sending unit is further configured to send data information to the first network side device based on the target grant free information, wherein data information sent by the sending unit to the first network side device using the dedicated grant free resource comprises data sent by the terminal device, and data information sent by the sending unit to the first network side device using the universal grant free resource comprises data sent by the terminal device and the first ID, wherein
when the target grant free resource is the dedicated grant free resource, the receiving unit is further configured to receive a valid range of the target grant free resource that is sent by the first network side device, and a first processing unit is configured to determine whether the valid range of the target grant free resource is exceeded,
when the valid range of the target grant free resource is not exceeded, the sending unit is further configured to send second data information to the first network side device using the dedicated grant free resource, wherein the second data information comprises data sent by the terminal device, and when the valid range of the target grant free resource is exceeded, the sending unit is further configured to send third data information to the first network side device using the universal grant free resource, wherein the third data information comprises data sent by the terminal device and the first ID.

14. The terminal device according to claim 13, further comprising:
the first processing unit configured to determine the mobility information; and
the sending unit configured to send the mobility information determined by the first processing unit to the first network side device.

15. The terminal device according to claim 14, wherein the first processing unit is configured to:
obtain status information of the terminal device; and
determine the mobility information of the terminal device based on the status information of the terminal device, wherein the status information of the terminal device comprises location information of the terminal device and/or a mobility attribute of the terminal device.

16. The terminal device according to claim 13, wherein the sending unit is configured to send first data information to the first network side device, wherein the first data information comprises the first ID and data sent by the terminal device.

17. The terminal device of claim 13, wherein the sending unit is further configured to:
when the target grant free resource is the dedicated grant free resource, send second data information to the first network side device using the dedicated grant free resource, wherein the second data information comprises data sent by the terminal device; or
when the target grant free resource is the universal grant free resource, send third data information to the first network side device using the universal grant free resource, wherein the third data information comprises data sent by the terminal device and the first ID.

* * * * *